(12) United States Patent
Hull

(10) Patent No.: US 7,136,644 B2
(45) Date of Patent: Nov. 14, 2006

(54) METHOD AND APPARATUS FOR CONTROLLING SERVICE ACQUISITION IN A LOCAL AREA NETWORK DEVICE

(75) Inventor: Andrew William Hull, Euless, TX (US)

(73) Assignee: Motorola, Inc., Schaumburg, IL (US)

( * ) Notice: Subject to any disclaimer, the term of this patent is extended or adjusted under 35 U.S.C. 154(b) by 142 days.

(21) Appl. No.: 09/995,726

(22) Filed: Nov. 29, 2001

(65) Prior Publication Data
US 2003/0100309 A1    May 29, 2003

(51) Int. Cl.
*H04Q 7/20* (2006.01)
*H04Q 7/00* (2006.01)

(52) U.S. Cl. ............... 455/432.1; 455/435; 455/422.1; 370/331; 370/332

(58) Field of Classification Search .. 455/456.1–456.6, 455/440, 414.3, 414.1, 414.2, 432.1, 433, 455/574, 436, 67.1, 432, 437, 438, 560, 422.1, 455/435; 370/338, 330, 331, 333, 401, 332
See application file for complete search history.

(56) References Cited

U.S. PATENT DOCUMENTS

| | | | |
|---|---|---|---|
| 5,684,801 A | 11/1997 | Amitay et al. | |
| 5,825,759 A * | 10/1998 | Liu | 370/338 |
| 5,875,185 A | 2/1999 | Wang et al. | |
| 5,949,776 A * | 9/1999 | Mahany et al. | 370/338 |
| 5,953,677 A * | 9/1999 | Sato | 455/574 |
| 6,069,887 A | 5/2000 | Geiger et al. | |
| 6,192,251 B1 * | 2/2001 | Jyogataki et al. | 455/414.1 |
| 6,216,385 B1 * | 4/2001 | Abe | 455/574 |
| 6,233,448 B1 * | 5/2001 | Alperovich et al. | 455/456.3 |
| 6,275,712 B1 * | 8/2001 | Gray et al. | 455/522 |
| 6,389,288 B1 * | 5/2002 | Kuwahara et al. | 455/456.6 |
| 6,397,072 B1 * | 5/2002 | Peters et al. | 455/456.3 |
| 6,434,381 B1 * | 8/2002 | Moore et al. | 455/414.3 |
| 6,477,156 B1 | 11/2002 | Ala-Laurila et al. | |
| 6,539,232 B1 * | 3/2003 | Hendrey et al. | 455/456.1 |
| 6,556,553 B1 * | 4/2003 | Palmer et al. | 455/440 |
| 6,647,265 B1 * | 11/2003 | Olofsson et al. | 455/433 |
| 6,807,417 B1 * | 10/2004 | Sallinen et al. | 455/560 |
| 6,985,750 B1 * | 1/2006 | Vicknair et al. | 455/435 |
| 2004/0198392 A1 * | 10/2004 | Harvey et al. | 455/433 |
| 2005/0048965 A1 * | 3/2005 | Ebata | 455/422.1 |
| 2005/0096072 A1 * | 5/2005 | Rahman et al. | 455/432.1 |
| 2005/0227688 A1 * | 10/2005 | Li et al. | 455/432.1 |

FOREIGN PATENT DOCUMENTS

| | | | |
|---|---|---|---|
| WO | WO 9966757 A1 * | 12/1999 | |
| WO | WO 0022860 A1 * | 4/2000 | |
| WO | WO0106799 A1 * | 1/2001 | |

* cited by examiner

*Primary Examiner*—Lana Le
(74) *Attorney, Agent, or Firm*—Charles W. Bethards

(57) ABSTRACT

A method of and WLAN device that is arranged and constructed to control service acquisition includes a transceiver for coupling to a second WLAN device; a user (I/O) for interacting with a user; and a controller for deciding whether the transceiver will enter a service acquisition mode thereby coupling to said second WLAN device by; determining a parameter that corresponds to a present environment for the WLAN device; comparing the parameter to a predetermined value to provide a comparison, the predetermined value defining, in part, an environment where service for the WLAN device is desirable; analyzing the comparison according to a rule to provide a decision; and enabling the service acquisition mode when the decision is favorable; and otherwise forgoing service acquisition.

11 Claims, 3 Drawing Sheets

1. IF LOCATION = HOME, ACCESS HOME CHANNEL
2. IF LOCATION = WORK AND TIME = M-F, ACCESS WORK CHANNEL
3. IF LOCATION = AIR TERMINAL AND TIME = SCHEDULED DEPARTURE +/- 2 HOURS, ACCESS ABC AIRLINE CHANNEL
4. IF OTHER LAN DEVICE = FRIEND, ALLOW SERVICE ACQUISITION

METHOD AND APPARATUS FOR CONTROLLING SERVICE ACQUISITION IN A LOCAL AREA NETWORK DEVICE

FIELD OF THE INVENTION

This invention relates in general to communication systems, and more specifically to a method and apparatus for controlling service acquisition is a wireless local area network device.

BACKGROUND OF THE INVENTION

Local Area Networks (LANs) are becoming more popular. Wireless LANs (WLANs) are being deployed and planned for in homes and small businesses. These WLANs are often a means of replacing or avoiding the installation and maintenance required for wired networks while providing some limited freedom of movement for users of the WLANs. Various specifications are available or are in some stage of development that describe the operation or interface between communications devices for various protocols or types of systems.

Examples of WLAN systems include the Bluetooth, Home RF, and 802.11 a and b systems and similar systems being proposed in Europe. All of these systems have some form of service acquisition mode that equipment operating according to the respective specifications utilizes in order to form a connection with another unit or units in the system. Due to the ad-hoc nature of these systems in general one does not know whether any other units are available and if so whether services that you desire are available. Since most of these systems operate in ISM frequency bands according to frequency hopped or other spread spectrum schemes with large numbers of "channels" the service acquisition procedures can be quite involved, relatively lengthy in time, and require numerous transmissions and other power intensive activities without any assurance that service will be acquired. An acquisition attempt can result in the loss of any security that anonymity may have been providing (you can not hack what you do not know exists) and repeated attempts can quickly deplete a battery for those wireless units that are battery powered, more or less essential for freedom of movement.

What is needed is a method and apparatus for controlling service acquisition in a WLAN device thereby improving battery life and security for the user of the WLAN device.

BRIEF DESCRIPTION OF THE DRAWINGS

The accompanying figures, where like reference numerals refer to identical or functionally similar elements throughout the separate views and which are incorporated in and form part of the specification, serve to further illustrate various embodiments in accordance with the present invention. The figures together with the detailed description, hereinafter below, serve to explain various principles and advantages in accordance with the present invention.

DETAILED DESCRIPTION OF PREFERRED EMBODIMENT

In overview form the present disclosure concerns ad-hoc communications systems or networks that provide service to local area network (LAN) devices or units or more specifically users thereof operating therein. More particularly various inventive concepts and principles embodied in methods and apparatus for the control of service acquisition activities are discussed, the motivation for such control being enhanced battery life and security for the device or users of the devices. The systems of particular interest are wireless LANs (WLANs), for example, those commonly known as Bluetooth, Home RF, 802.11 a and b, and the like that are in varying stages of planning and deployment.

As further discussed below various inventive principles and combinations thereof are advantageously employed to limit or control service acquisition to those circumstances or situations or environments where acquisition is most likely to be successful and most likely to be needed thus alleviating the battery depletion and security problems associated with known systems, devices and procedures while still facilitating device or users service needs provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
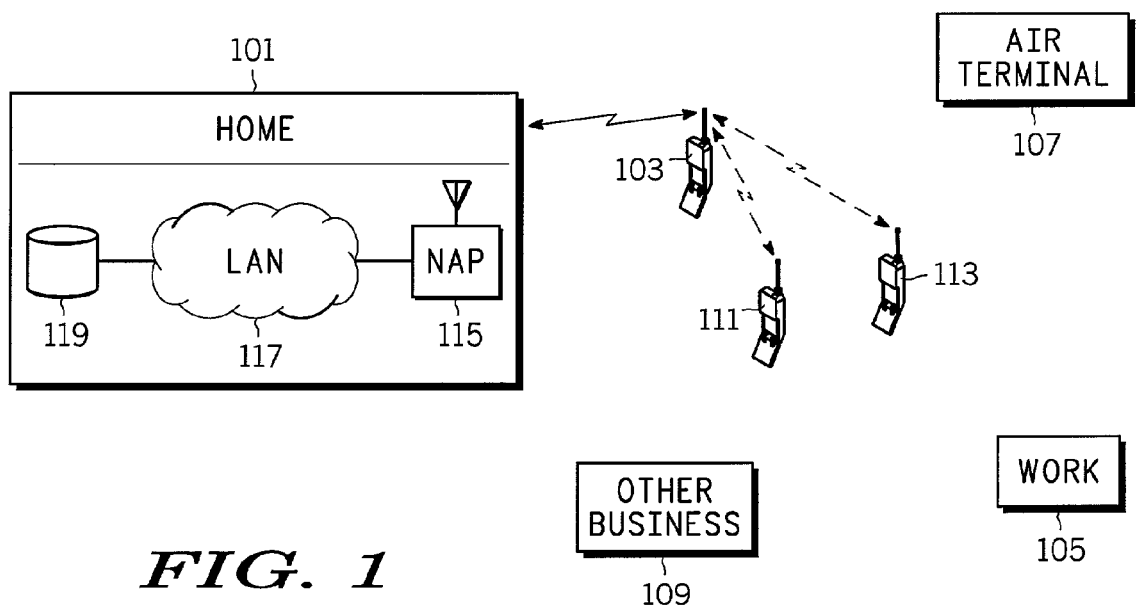
FIG. 1 depicts, in a simplified and representative form, a diagram of circumstances a wireless local area network (WLAN) device can encounter.

The present disclosure will discuss various embodiments in accordance with the invention. These embodiments include methods, communications devices, and communications systems employing each or all of the aforesaid. Referring to the FIG. 1 simplified and representative diagram, various circumstances that a wireless local area network (WLAN) device may encounter will be described. FIG. 1 in large part and at the simplified level depicted is a representative diagram and will serve to explain the problems and certain inventive solutions thereto thereby laying the groundwork for a deeper understanding of the present invention and advantages thereof.

This WLAN device 103 may be nearly anything including a portable computer, cellular phone, headset, personal digital assistant (PDA), messaging device, wireless wallet, etc. There are those who believe that someday nearly everything will be linked to one or more other things. For our purposes in the instant disclosure we will assume the device is a PDA but note we could as well assume any number of other things or collective combinations of other things. We will also assume it is a Bluetooth equipped PDA. Various locations where the user of the WLAN device, thus device may go are shown. For example, home 101, Work 105, air terminal 107 and multiple other businesses, (one depicted) 109 are shown. In addition a multiplicity of other WLAN devices, such as device 111, 113 may be encountered. Also note that, as shown at the home 101, the device 103 will encounter network access points (NAPs) 115 in those locations where WLAN devices are provided access to various data. A NAP is essentially another WLAN device but likely in a fixed location with a power supply rather than a battery. These NAPS typically connect to a wired LAN 117 and thus to one or more servers or databases 119 either locally situated or available on a wide area network such as the Internet.

Since we have assumed a Bluetooth equipped device an overview of a system as defined by the Bluetooth specification will be provided. The Bluetooth system is a low power very limited range frequency hopped system that operates in a frequency band, preferrably, in the 2.4 Ghz range. The operating frequency band in most countries consists of 79 channels (some countries originally had have 23 channels) spaced 1 Mhz apart with a data rate of 1 Mbps using gausian frequency shift keyed (GFSK) modulation. Bluetooth devices, such as the NAPs and communication devices or units of FIG. 1 can form piconets on an adhoc basis where each piconet will have a device designated master and one or more, up to seven, devices designated slaves. A master in one piconet can be a slave in a second or more piconets. Each master will have a unique Identification (ID) and this ID determines a unique frequency hopping pattern and phase within that pattern for the piconet associated with that master to operate on.

In a given piconet a master and slave can establish communications connections to facilitate service for the communications device. These connections can be asynchronous, isochronous, or synchronous with the former predominantly used for packet or packet switched applications and the latter for continuous or circuit switched applications, such as voice, etc. The connection may be initiated by either the master or the slave. As an overview, for example, (full and complete details in the Bluetooth specifications) the slave will broadcast an inquiry sequence and the master will respond with a message indicating supported services and an ID. The slave if the services are those desired then completes a service access or acquisition routine.

Generally the master will transmit to a given slave, identified by an address assigned when a connection is established with that slave, during one time slot or frequency hop and receive from that same slave during the subsequent time slot. The master then transmits to another identified slave during the next timeslot or hop and receives during the subsequent slot, etc. When a slave moves beyond the coverage area of the master that is attempting unsuccessfully to provide service by way of the connection, the connection will be dropped by the master and the slave after the lapse of a time out period. The slave will enter a further service acquisition activity including inquiry, service discovery and access sequence in hopes of discovering service available from another piconet or master.

Assuming a master is available and responds and has suitable services and available capacity a connection can be established with this master operating on another frequency hopping pattern. Unfortunately this may take a significant amount of time during which connections from the slave to external services such as Web based applications may also have been terminated. For further elaboration, detail, and background please see the Bluetooth specifications available at www.bluetooth.com that are herein incorporated by reference in there entirety as of the date of this application. Specifications for Home RF and 802.11 systems are likewise available over the World Wide Web.

Also note that, as shown at the home 101, the device 103 will encounter network access points (NAPs) 115 in those locations where WLAN devices are provided access to various data. A NAP is essentially another WLAN device but likely in a fixed location with a power supply rather than a battery. These NAPS typically connect to a wired LAN 117 and thus to one or more servers or databases 119 either locally situated or available on a wide area network such as the Internet. Suffice it to say that WLAN device 103 does not always want to initiate or respond to a service acquisition attempt in order to connect to other WLAN devices it may encounter. Doing so requires battery capacity and gives up a degree of security. Furthermore note that if the three places of interest are in even a small city most of the locations in the city will be of no interest to the device. Furthermore, especially when these systems are being installed most of the city will not have any other devices. Thus randomly looking attempting a service acquisition is likely to be unsuccessful and merely drain the battery.

For example, usually when the device 103 is near home it will want to undertake service acquisition or discovery activities in order to connect to NAP 115. Similarly when the device is near work it will typically want to connect to the appropriate NAP for work. Note there may be numerous NAPs at or around work and the WLAN device 103 will typically want to be selective as to which of these it connects to and this may depend on the day and time when you are at work. Other than frequently visited businesses, such as a grocery store it is likely that the device will not want to connect to NAPs at other businesses, such as 109. In the case of the grocery store the device may want to connect to a NAP at the store on the days you are going to shop.

At other locations the WLAN device 103 will want to connect to certain local NAPs but probably only under certain circumstances or states. For example, if you are at the airport terminal and scheduled for a flight within a couple of hours or at the terminal to pick up someone from a flight you would want the device to connect to the appropriate airline NAP for gates and schedule information. However if you were there to pick up or ship a package or to meet someone for lunch you may not want to connect to any other NAP. Thus the WLAN device needs to be able to determine whether and when to attempt service acquisition and the instant disclosure discusses various embodiments according to the present invention for so controlling service acquisition.

Figure 2:
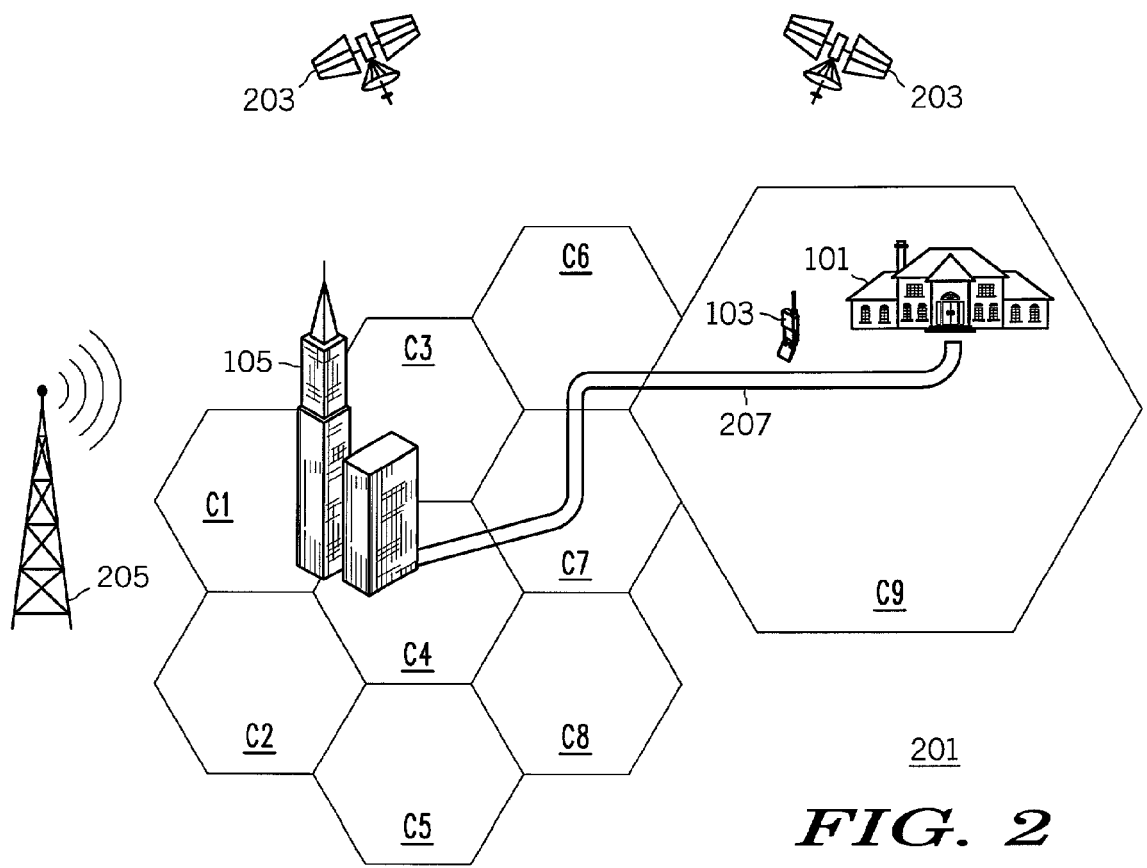
FIG. 2 depicts, various systems that may be used by a WLAN device for determining its location.

As suggested above various parameters will be helpful in controlling service acquisition or in deciding whether to attempt acquisition. For example, location, time, and various other state type of parameters or combinations there of will be useful. For determining location, FIG. 2 depicts various systems that may be used by a WLAN device for doing so. The most obvious might be the cellular phone system 201. By knowing the cell ID one has some information regarding location. For example the home 101 is located in cell c-92 and that cell will have a unique cell ID. Work 105 by observation is in cells c-1, c-3, and c-4 and they will have unique IDs as well. As device 103 moves or is transported from Home to Work along path 207 it should forego service acquisition in cells c-6 and c-7.

Another approach for determining location that is becoming more prevalent is geographical coordinates determined from a global positioning system shown as the GPS satellites 203. Yet another approach is a signal strength measurement from some broadcast tower such as WGN 205. In each of these cases our presumed PDA will need access to one or more of a cell phone, GPS receiver, or broadcast receiver to obtain the relevant information. This is not anticipated to be a practical problem as the PDA may well include a cell phone or broadcast receiver or in some cases a GPS receiver. Even if not included the user of the PDA likely has one of these devices and of one of ordinary skill could port the appropriate information to the PDA. Furthermore these other receivers are likely to include Bluetooth based devices as well and the relevant information would be coupled from one of them to the PDA using a Bluetooth connection.

Figures 3, 4:
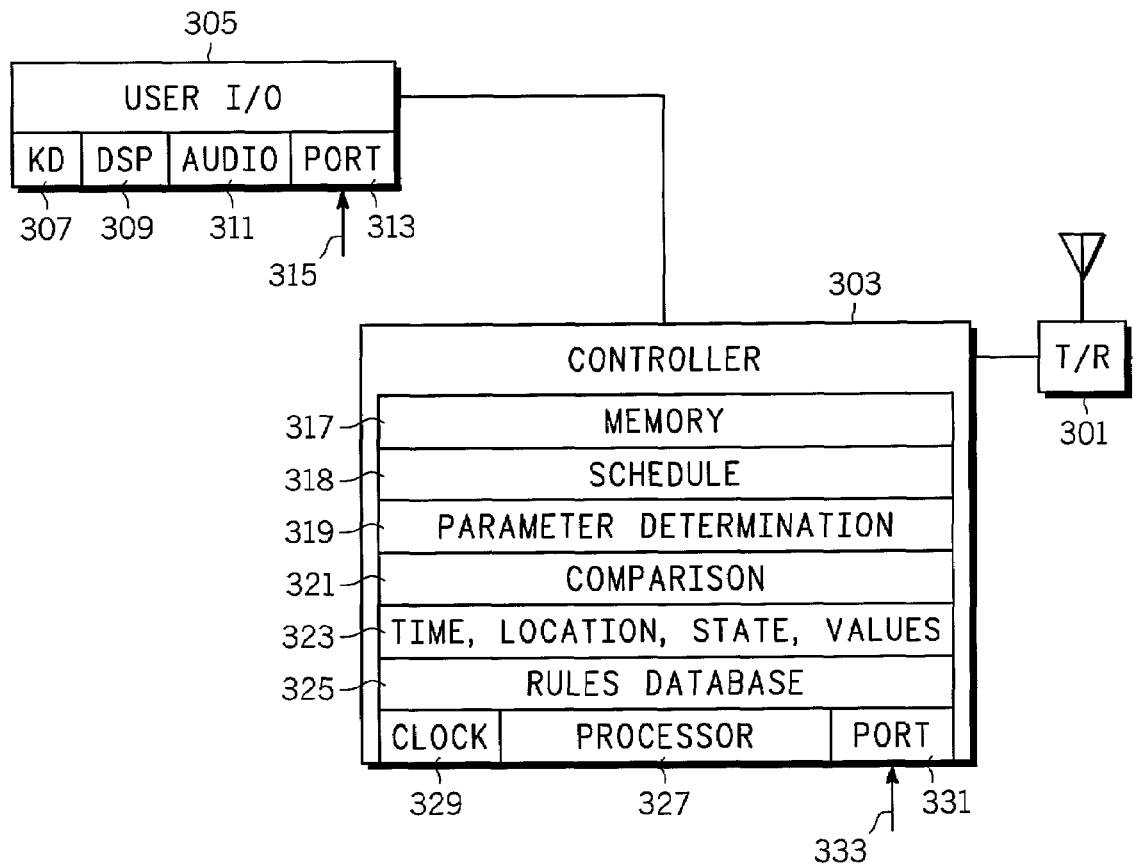
FIG. 3 depicts a block diagram of a preferred embodiment of a WLAN device in accordance with the present invention.
FIG. 4 depicts an exemplary rules database for the device of FIG. 3.

Referring to FIG. 3 a block diagram of a preferred embodiment of a WLAN device 300 according to the present invention will be described. This WLAN device 300 is arranged and constructed to control service acquisition under circumstances such as discussed above with reference to device 103. WLAN device 300 includes a transceiver 301 for coupling to a second or a multiplicity of other WLAN device according to one or more protocols such as Bluetooth, Home RF, 802.11, and the like. Further included is a controller 303 that is coupled to the transceiver and to a user input output (I/O) function 305. The User I/O 305 includes various functionality operating in known ways that is normally associated with interaction with a user such as a keyboard 307, display 309, audio 311, specifically microphone or speaker if required. Also shown is a port 313 that may be coupled at 315 to an external device such as cell phone, GPS receiver, broadcast receiver, or perhaps a computer (non shown) to provide, for example, location information.

Controller 303 includes a processor 327, preferably a microprocessor based processor that is widely available, that is coupled to a memory 317. The memory 317 uses known technology and will be utilized for among other purposes, storing software instructions that when executed by the processor result in the controller controlling the operation of the transceiver and user I/O according to the relevant system specification, here preferably Bluetooth. The controller, coupled to said user I/O and said transceiver, will decide whether the transceiver 301 under its control will enter a service acquisition mode thereby coupling to one or more other WLAN devices.

Also included in memory 317 is a schedule routine and database 318 that is used to maintain a schedule such as would be found in a PDA for the user. One might expect meeting or travel times, dates, meeting rooms, airline flight numbers and so on. Further is a parameter determination routine 319 that is for determining one or more parameters, such as time, location, and state that individually or in combination correspond to a present environment for the WLAN device. The time parameter would be available from a clock 329 and it should be understood that time as used herein also includes calendar information such as day, date, year etc. Location parameter would be available either by way of a WLAN connection with the appropriate device as discussed above or through the port 331 at connection 333 or from the user I/O via port 313. Specifically the WLAN device can determine location using a cellular zone ID, a global position system (GPS) signal, or a signal strength measurement State or stateful, as sometimes denoted, information is more interesting and largely limited by ones imagination. For example, a flight is scheduled within the next 1 hour or a meeting on Tuesday, the meeting being one that occurs each week or a known WLAN device is attempting to set up a connection or the battery is almost depleted are all examples of state information that alone or in combination with location and time parameters will impact whether and what service acquisition activities to undertake or enable. For example if you are at the air terminal and your flight is scheduled within an hour or so you would like for the WLAN device to attempt service acquisition with the LAN for the airline that your flight is scheduled on in order to obtain gate and current schedule information. If it is time for the meeting on Tuesday and you are at work and the previous weeks you have connected to a financial LAN it is likely that you want to do so again. In short determining a state is determining circumstances relevant to the WLAN device or specifically the user of the WLAN. It may include detecting a need or likely need for service or a reference to a schedule database. Determining the proper parameters will often include determining a combination of location, time, and state for the WLAN device.

Further included in the memory 317 is a comparison routine 321 and database for predetermined values 323 of time, location, and state. The predetermined values define, in part, individually or in combination an environment where some sort of service for the WLAN device may be desirable. These values may be home, work, air terminal, 8 AM Tuesday, computer coupled to port 331, etc. The comparison routine is for comparing the parameters determined, assessed, or measured above to the appropriate predetermined values thus providing one or more comparisons.

Further included is a rules database 325. The rules will be such as the rules 1–4 shown in FIG. 4 by way of example. The controller will analyze the comparisons according to the rules to provide a decision as to whether to pursue service acquisition and, preferably, as to what service from what WLAN device. If the decision is favorable the controller will enable a service acquisition mode and forego the service acquisition mode when the decision is unfavorable.

The predetermined values and rules can be placed in memory in a number of ways. One is for the user, device manufacturer, or service provider to preprogram the WLAN device. Another is for the device to memorize the various values when instructed to do so by the user via the keyboard. Lastly the WLAN device can memorize or learn the appropriate values and rules based on a history of use. For example, if location=home connect to the home WLAN. It is expected that these principles and concepts will have application to WLAN devices arranged and constructed to operate within Bluetooth, 802.11, Home RF, and the like based wireless WLANs.

Figure 5:
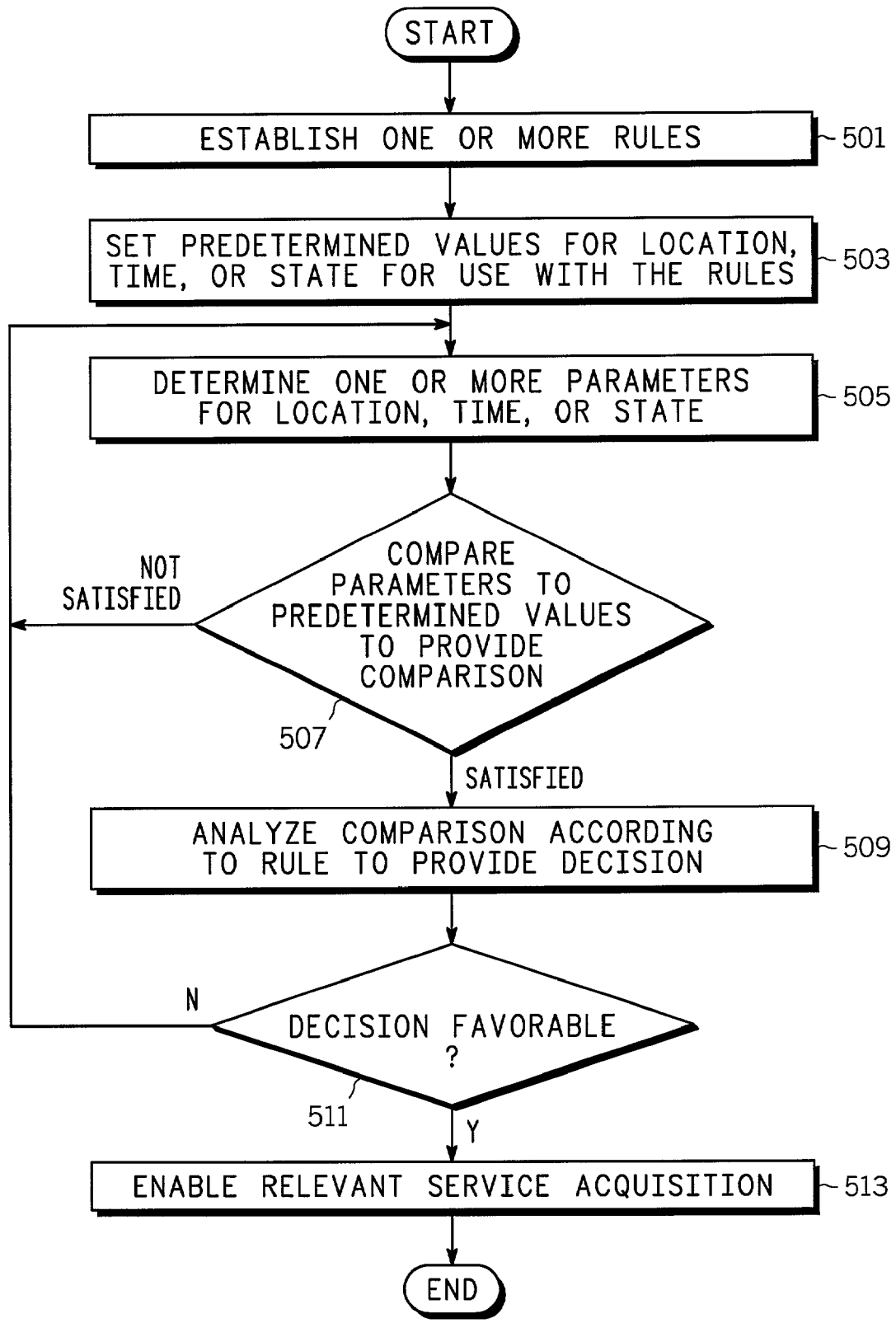
FIG. 5 shows a preferred method embodiment according to the present invention.

Referring to FIG. 5 a preferred method embodiment according to the present invention will be described. This will be somewhat in the nature of a review of some of the discussions above. The method 500 is a process for controlling service acquisition in a wireless local area network (WLAN) device. The method starts and at 501 one or more rules for service acquisition are established. At 503 various predetermined values for location, time or state parameters for use with the rules are set or established. These predetermined values define, in part, environments where some sort of service for the WLAN device is desirable. Note these activities, as implied above, can be ongoing as the device is utilized. At any rate at 505 the method determines one or more parameters for location, time, and state, that correspond individually or in combination to a present environment for the WLAN device.

At 507 the process compares the parameters to the predetermined values to provide comparisons. If one or more of the comparisons is satisfactory the process moves to 509 where the comparison is analyzed according to the rules to provide a decision. If the comparisons are not satisfactory the process returns to step 505 and continues to monitor the environment. At 511 the decision according to the rules is tested and if favorable the relevant service acquisition mode is enabled at step 513 and if not favorable the process returns to step 505 thus foregoing any service acquisition mode.

The WLAN devices, systems, and processes, discussed above, and the inventive principles and concepts thereof are intended to and will alleviate problems caused by prior art service acquisition methodologies in ad-hoc WLANs. Using these principles of controlling service acquisition will help to alleviate battery consumption and avoid unnecessary security risks for WLAN devices that are used in situations where the device is routinely moved from one location to another thus facilitating connectivity for mobile individuals. One of the principles used is enabling service acquisition only under conditions or in environments where it is likely to needed. Furthermore using the principles and concepts of learning or memorization of environments discussed above will make utilization of the WLAN devices much more convenient and user friendly.

Various embodiments of methods, systems, and WLAN devices for controlling service acquisition so as to reduce battery depletion and minimize security concerns have been discussed and described. It is expected that these embodiments or others in accordance with the present invention will have application to many wireless local area networks that are coupled to fixed WANS such as the PSTN or internet and thus facilitate providing user friendly services. The disclosure extends to the constituent elements or equipment comprising such systems and specifically the methods employed thereby and therein. Using the inventive principles and concepts disclosed herein is expected to be beneficial to users and providers a like.

This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A wireless local area network (WLAN) device arranged and constructed to control service acquisition comprising in combination:

a transceiver for coupling to a second WLAN device;

a user input output (I/O) for interacting with a user, and a controller, coupled to said user I/O and said transceiver, for deciding whether said transceiver will enter a service acquisition mode thereby coupling to said second WLAN device by;

determining a parameter that corresponds to a present environment for the WLAN device;

comparing said parameter to a predetermined value to provide a comparison, said predetermined value defining, in part, an environment where service for the WLAN device is desirable;

analyzing said comparison according to a rule to provide a decision;

enabling said service acquisition mode when the decision is favorable; and foregoing said service acquisition mode when the decision is unfavorable.

2. The WLAN device of claim 1 wherein said step of determining a parameter includes determining a location of the WLAN device.

3. The WLAN device of claim 2 wherein said determining said location uses one of a cellular zone ID, a global position system (GPS) signal, and a signal strength measurement.

4. The WLAN device of claim 1 wherein said step of determining a parameter includes determining a time at the WLAN device.

5. The WLAN device of claim 1 wherein said step of determining a parameter includes determining a state relevant to the WLAN device.

6. The WLAN device of claim 5 wherein said determining said state includes one of detecting a need for service and a reference to a schedule database.

7. The WLAN device of claim 1 wherein said step of determining a parameter includes determining a combination of location, time, and state for the WLAN device.

8. The WLAN device of claim 1 further including a step of programming said predetermined value for the WLAN device.

9. The WLAN device of claim 8 wherein programming said predetermined value includes programming the WLAN device with one of a location, time, and state.

10. The WLAN device of claim 8 wherein providing said predetermined value includes memorizing one of a location, time, and state when service has been acquired.

11. The WLAN device of claim 1 arranged and constructed to operate within one of a Bluetooth, 802.11, and Home RF based wireless WLAN.

* * * * *